(12) United States Patent
Zhang

(10) Patent No.: US 9,874,129 B2
(45) Date of Patent: Jan. 23, 2018

(54) SCR DEVICE

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/091,001

(22) Filed: Apr. 5, 2016

(65) Prior Publication Data

US 2017/0284265 A1    Oct. 5, 2017

(51) Int. Cl.
*F01N 3/00* (2006.01)
*F01N 3/28* (2006.01)
*F01N 3/20* (2006.01)

(52) U.S. Cl.
CPC ............ *F01N 3/2892* (2013.01); *F01N 3/208* (2013.01); *F01N 2610/02* (2013.01)

(58) Field of Classification Search
USPC .......... 60/274, 286, 295, 297, 301, 303, 324
See application file for complete search history.

(56) References Cited

U.S. PATENT DOCUMENTS

| | | | |
|---|---|---|---|
| 6,883,308 B2 | 4/2005 | Megas et al. | |
| 7,152,396 B2* | 12/2006 | Cheng | F01N 3/0814 222/145.5 |
| 8,302,389 B2 | 11/2012 | Strots et al. | |
| 2006/0162690 A1* | 7/2006 | Kim | F01N 13/08 123/306 |
| 2006/0245296 A1* | 11/2006 | Nishioka | B01D 53/8631 366/174.1 |
| 2007/0151232 A1* | 7/2007 | Dalla Betta | F01N 3/0814 60/286 |
| 2013/0104531 A1 | 5/2013 | Cho et al. | |
| 2014/0033686 A1* | 2/2014 | Fischer | B01F 3/04049 60/286 |
| 2014/0360165 A1 | 12/2014 | Ardanese et al. | |
| 2015/0377104 A1* | 12/2015 | Mueller-Haas | F01N 3/2066 60/295 |

* cited by examiner

*Primary Examiner* — Binh Q Tran
(74) *Attorney, Agent, or Firm* — Julia Voutyras; McCoy Russell LLP

(57) ABSTRACT

Methods and systems are provided for an SCR device configured to store an amount of urea. In one example, a system may include rotating a plurality of plates in the SCR as exhaust gas flows through the SCR.

19 Claims, 6 Drawing Sheets

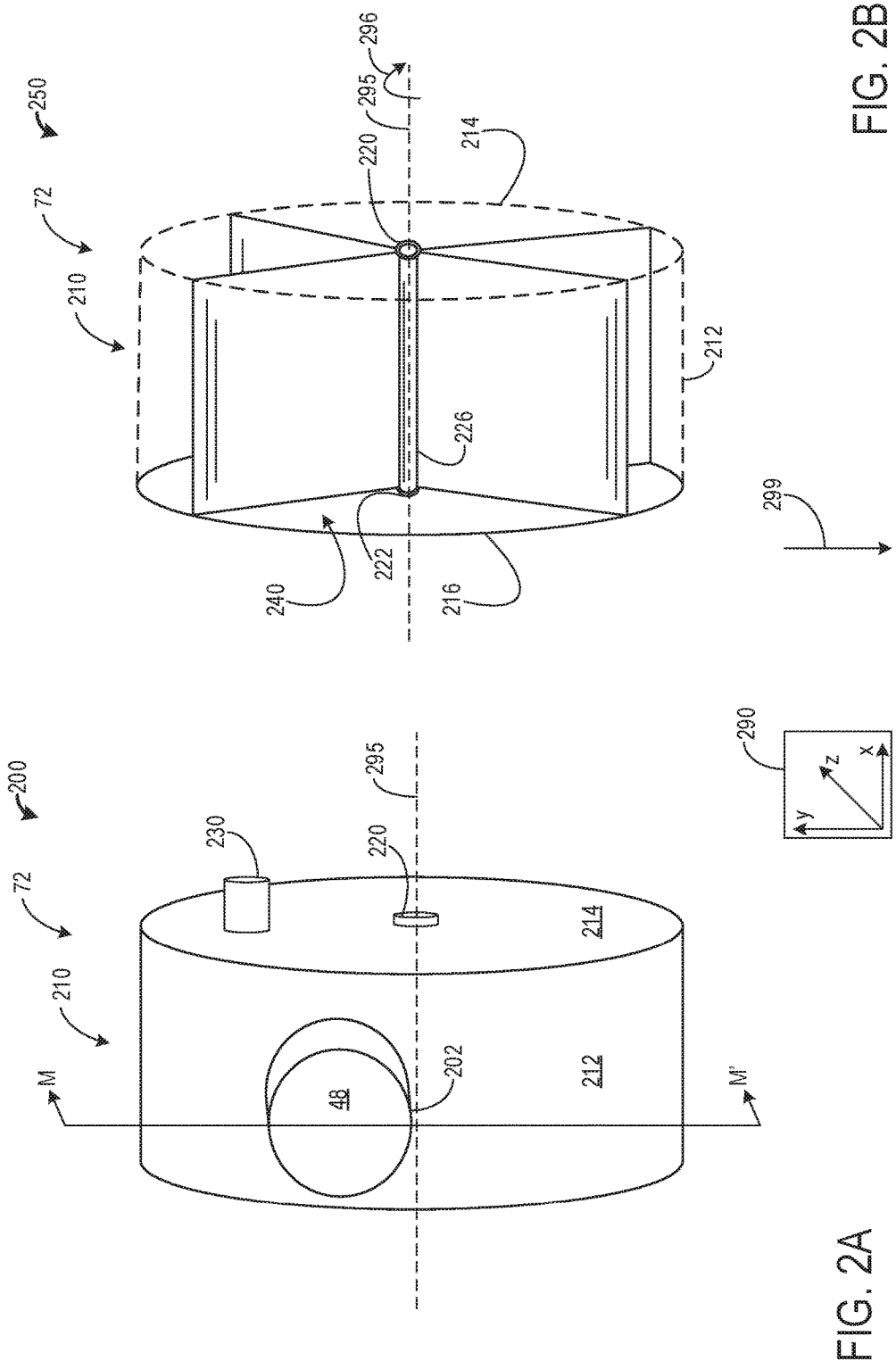

SCR DEVICE

FIELD

The present description relates generally to a selective catalytic reduction (SCR) device.

BACKGROUND/SUMMARY

One technology for after-treatment of engine exhaust utilizes selective catalytic reduction (SCR) to enable certain chemical reactions to occur between $NO_x$ (nitrogen oxides) in the exhaust and ammonia ($NH_3$). $NH_3$ is introduced into an engine exhaust system upstream of an SCR device by injecting urea into an exhaust pathway, or is generated in an upstream catalyst. The urea entropically decomposes to $NH_3$ under high temperature conditions. The SCR facilitates the reaction between $NH_3$ and $NO_x$ to convert $NO_x$ into nitrogen (N2) and water (H2O). However, as recognized by the inventors herein, issues may arise upon injecting urea into the exhaust pathway. In one example, urea may poorly mix into the exhaust flow (e.g., a first portion of exhaust flow has a higher concentration of urea than a second portion of exhaust flow) which may lead to poor coating of the SCR and poor reactivity between emissions (e.g., $NO_x$) and the SCR device. Additionally, overly mixing and agitating the urea in the exhaust can likewise cause issues, such as increased deposits.

Attempts to address insufficient mixing include introducing a mixing device downstream of a urea injector and upstream of the SCR device such that urea dispersion with exhaust gas may be more homogenous. Other attempts to address urea mixing include a stationary mixing apparatus. One example approach is shown by Cho et al. in U.S. 2013/0104531. Therein, a static mixer is located in an exhaust passage downstream of an external tube for injecting urea. The exhaust gas flows through the exhaust passage and merges with a urea injection before flowing through the static mixer.

However, the inventors herein have recognized potential issues with such systems. As one example, the static mixer described above presents limited mixing capabilities due to a directionality of exhaust outflow through the mixer being unable to fully mix the urea and exhaust gas. The static mixer inside the exhaust passage also presents manufacturing and packaging constraints. Varying exhaust passage geometries demand an alteration in the manufacturing of the exhaust passage and/or static mixer for the mixer to tightly fit within the exhaust passage. Lastly, the static mixer may overly agitate the urea. Thus, deposits may form on surfaces of the mixer and/or downstream of the mixer (onto the SCR device, for example). These deposits may accumulate and hinder exhaust flow through the exhaust passage thereby increasing an exhaust backpressure.

The inventors herein have recognized the issues with the above approach and offer a system to at least partly address them. In one example, the issues described above may be addressed by a system for a hollow cylindrical selective catalytic reduction device located along an exhaust passage comprising a plurality of plates configured to rotate via a rotatable rod as exhaust gas flows through the device, and a shaft configured to flow urea into the device, where the urea is stored in a lower portion of the device. In this way, the SCR does not rely on a urea injector and/or a mixer.

As one example, the plates comprise of one or more SCR catalysts and divide an interior of the SCR into compartments, where the compartments are fluidly coupled to one another. Exhaust gas flows into a compartment and presses against a downstream plate to rotate the plates toward an outlet of the SCR. The plates rotate through the stored urea, where the urea may coat surfaces of the plates or the urea may vaporize as exhaust gas heats it by flowing through the plates toward the urea. By doing this, the urea is dispersed into a head space of the SCR, where a rotation of the plates may mix the urea with exhaust gas. Thus, an area for the urea to mix into is decreased, which may increase a dispersion efficiency without the use of a urea injector and/or mixer. This may decrease emissions without additional packaging constraints being introduced to the vehicle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2A and 2B show exterior and interior views of the SCR device, respectively.

FIGS. 2A-3C are shown approximately to scale, however, other relative dimensions may be used.

DETAILED DESCRIPTION

Figure 1:
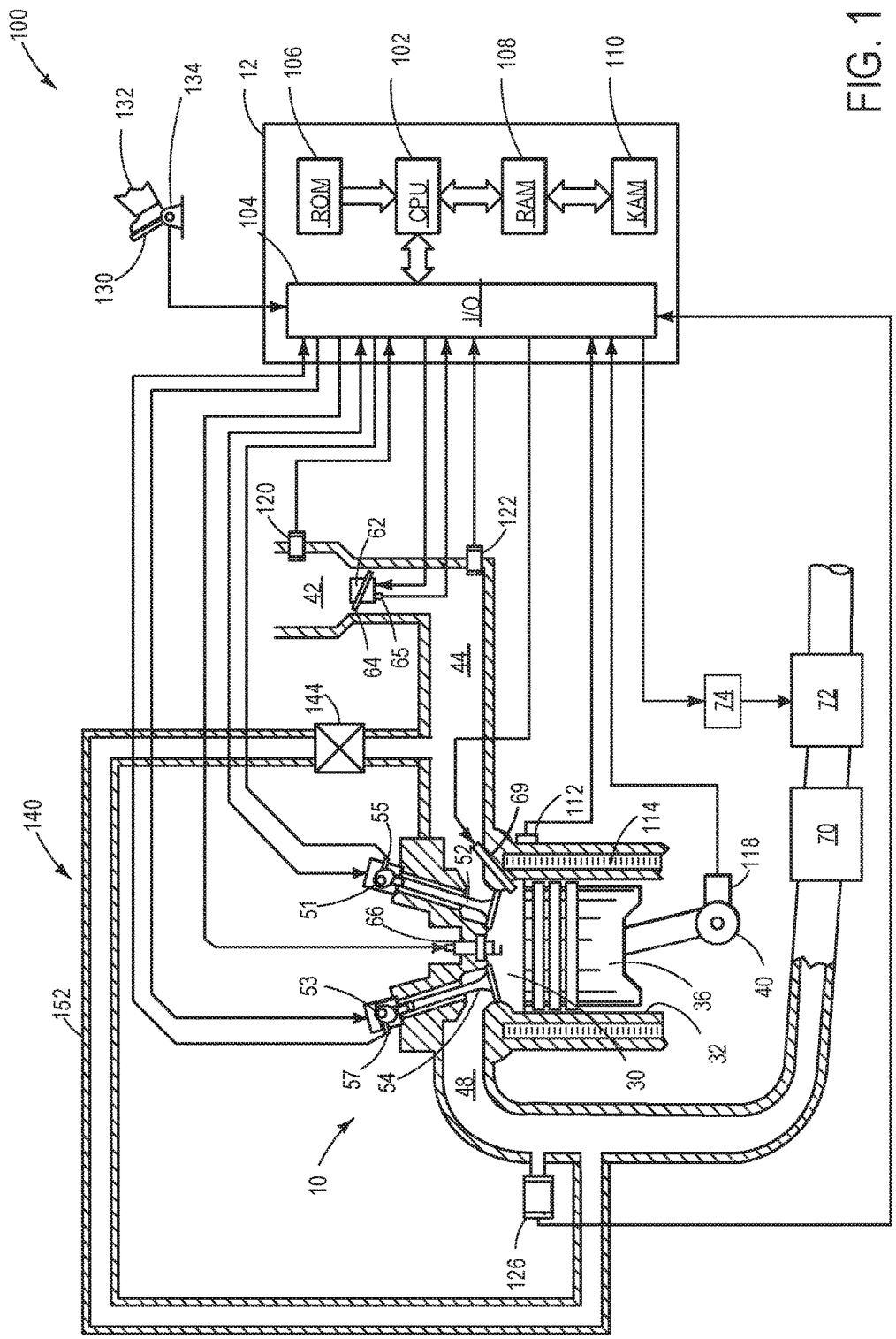
FIG. 1 shows a schematic view of an engine.
Figure 3A:
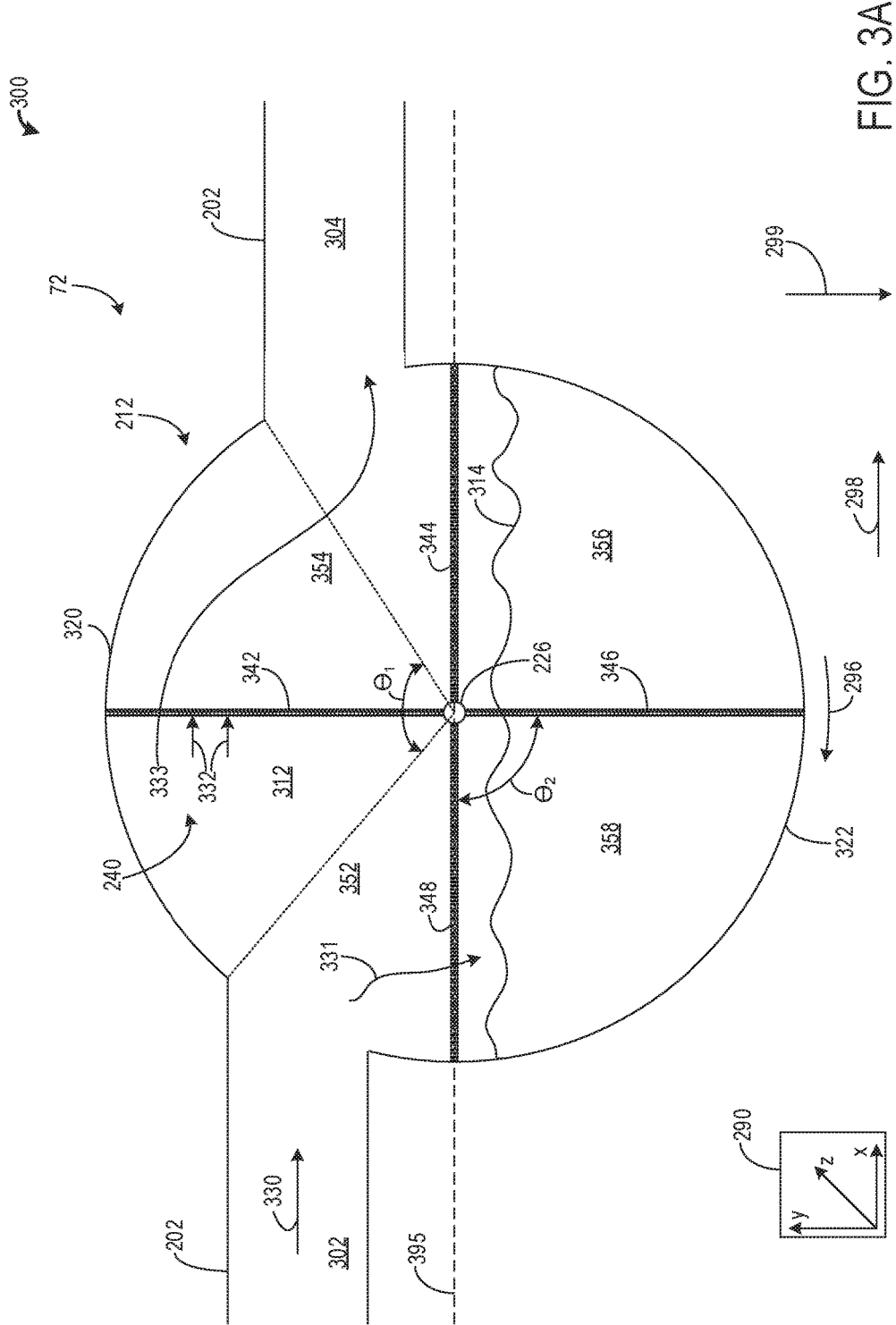
FIGS. 3A, 3B, and 3C show various rotational positions of plates located in the SCR device as exhaust as flows through the SCR device.
Figure 3B:
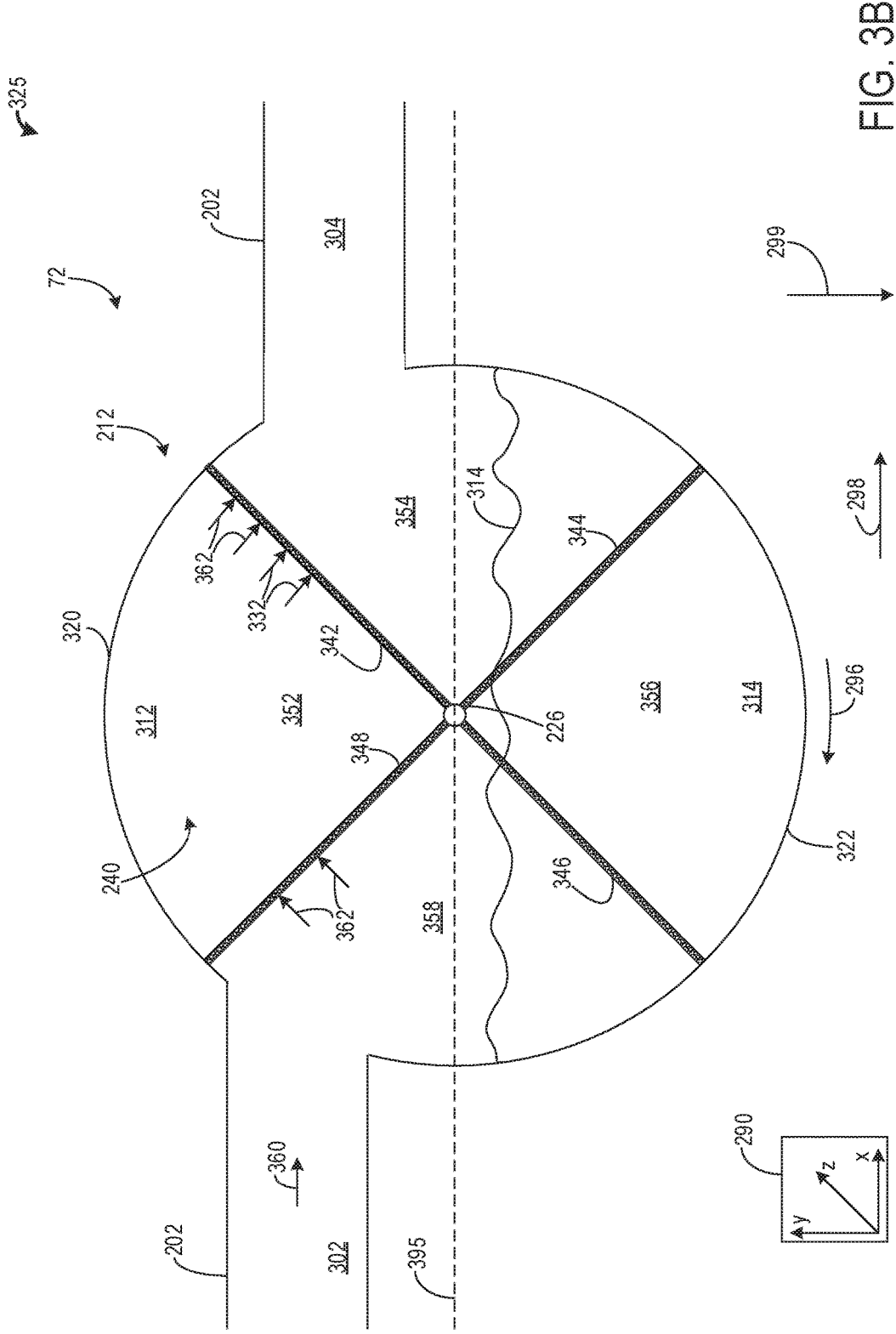
Figure 3C:
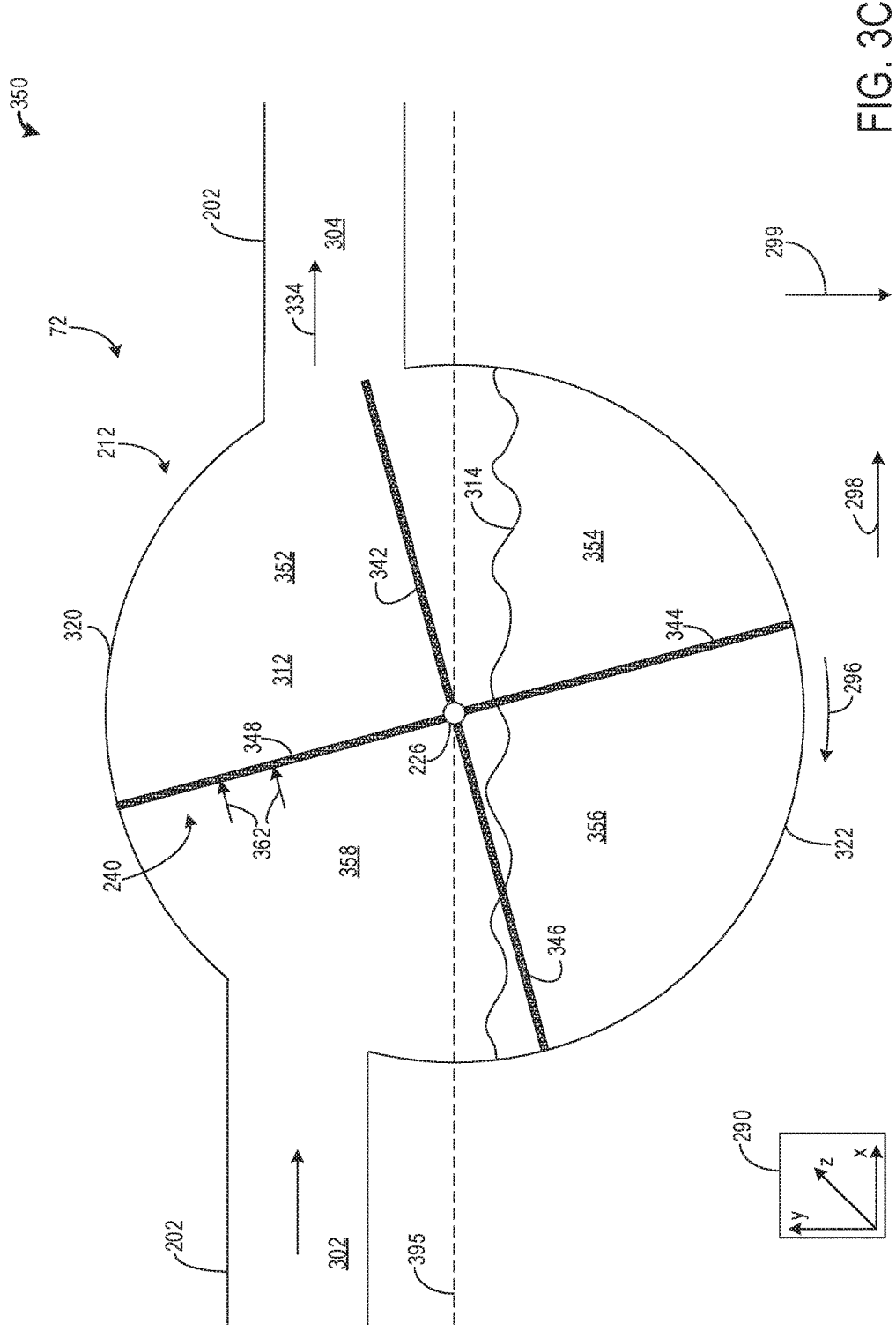
Figure 4:
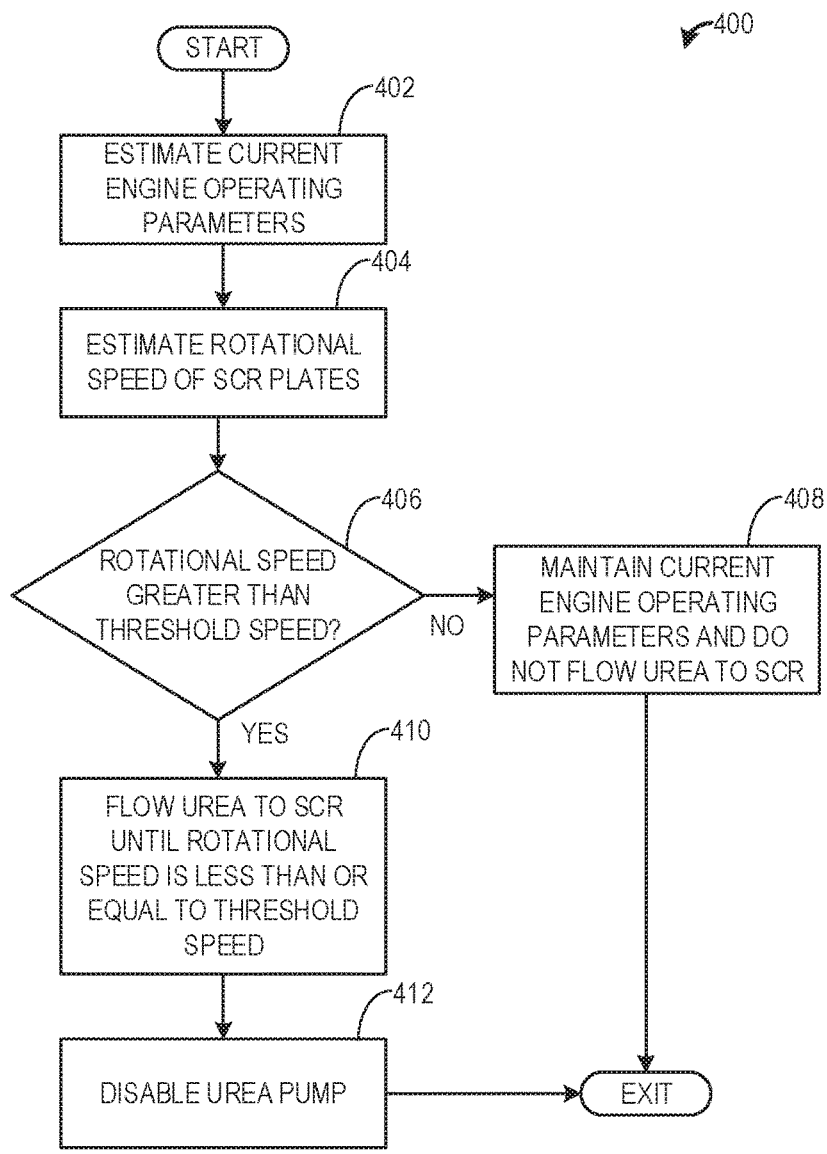
FIG. 4 shows a method for flowing urea to the SCR device.

The following description relates to systems and methods for flowing exhaust gas through an SCR device configured to store urea. The SCR device is located along an exhaust passage, as shown in FIG. 1. The SCR device is cylindrical with a plurality of plates located therein, as shown in FIGS. 2A and 2B. The plates are physically coupled to a rotatable rod in the SCR device, where the plates divide an interior of the SCR device into compartments substantially equal to one another in volume. Since the plates are open to exhaust gas flow, the compartments are fluidly coupled to one another. As such, exhaust gas may flow from one compartment to another compartment. Furthermore, exhaust gas may flow through the plates and evaporate the urea. The rod is rotatably coupled to a pair of bushings located on opposite sides of the SCR device. Exhaust gas may flow into the SCR device and press against surfaces of the plates such that the plates rotate within the SCR device. Based on a rotational position of the plates, exhaust gas may either enter a compartment, be stored in a compartment, or flow out of a compartment and into a remainder of the exhaust passage, as shown in FIGS. 3A, 3B, and 3C. An exemplary method for replenishing urea in the SCR device based on a rotational speed of the plates in the SCR is shown in FIG. 4.

FIGS. 2A-3C show example configurations with relative positioning of the various components. If shown directly contacting each other, or directly coupled, then such elements may be referred to as directly contacting or directly coupled, respectively, at least in one example. Elements described as directly downstream or directly upstream of one another may be defined herein such that there are no intervening components between the two comparative elements. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Continuing to FIG. 1, a schematic diagram showing one cylinder of a multi-cylinder engine 10 in an engine system 100, which may be included in a propulsion system of an automobile, is shown. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal. A combustion chamber 30 of the engine 10 may include a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector 69 may be mounted in the side of the combustion chamber or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust passage 48 upstream of an emission control device 70 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), $NO_x$, HC, or CO sensor. In one example, upstream exhaust gas sensor 126 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 70 is shown arranged along the exhaust passage 48 downstream of the exhaust gas sensor 126. The device 70 may be a three way catalyst (TWC), particulate filter, various other emission control devices, or combinations thereof. In some examples, during operation of the engine 10, the emission control device 70 may be periodically reset by operating at least one cylinder of the engine within a particular air-fuel ratio.

A selective catalytic reduction (SCR) device 72 is shown arranged along the exhaust passage 48 downstream of the emission control device 70. In some examples, the emission control device 70 may be omitted and only the SCR device 72 may be located downstream of the exhaust gas sensor 126. In other examples, the SCR device 72 may be upstream of the emission controller device 70. The SCR device 72 may be fluidly coupled to a reservoir 74 for receiving a reductant via a passage. In one example, the reservoir 74 stores urea and delivers urea to the SCR device 72 via a pump based on instructions from controller 12. The SCR device 72 will be described in greater detail below.

An exhaust gas recirculation (EGR) system 140 may route a desired portion of exhaust gas from the exhaust passage 48 to the intake manifold 44 via an EGR passage 152. The amount of EGR provided to the intake manifold 44 may be varied by the controller 12 via an EGR valve 144. Under some conditions, the EGR system 140 may be used to regulate the temperature of the air-fuel mixture within the combustion chamber, thus providing a method of controlling the timing of ignition during some combustion modes.

The controller 12 is shown in FIG. 1 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed. The controller 12 receives signals from the various sensors of FIG. 1 and employs the various actuators of FIG. 1 to adjust engine operation based on the received signals and instructions stored on a memory of the controller. For example, adjusting the pump of the reservoir 74 may include adjusting an actuator of pump to adjust reductant flow to the SCR device 72 from the reservoir 74.

FIGS. 2A and 2B show side perspective views of a portion of SCR device 72 of exhaust passage 48. As such, components previously introduced in FIG. 1 are numbered similarly in FIGS. 2A and 2B and may not be reintroduced. In this embodiment, the device includes an example rotatable paddle-wheel configuration with rotating paddles having a substrate with a catalyst coated thereon.

FIG. 2A shows an exterior side perspective view 200 of SCR device 72 incorporated in an exhaust passage (exhaust passage 48 of FIG. 1, for example) of an exhaust pipe 202. FIG. 2B shows an interior side perspective view 250 of the SCR device 72. Specifically, FIG. 2B shows the same side perspective view of SCR device 72 shown in FIG. 2A, except that in FIG. 2B, portions of the SCR device 72 are transparent, exposing an interior of the SCR device 72. FIGS. 2A and 2B may therefore be described together in the description herein.

An axis system 290 comprising three axes namely, an x-axis parallel to the horizontal direction, a y-axis parallel to the vertical direction, and a z-axis perpendicular to the x- and y-axes. The axis system 290 may be used to describe the relative positioning of components of the SCR device 72. A "height" of the SCR device 72 and/or its components may be used to define the extent of the components along the y-axis. Similarly, a "length" of components of the SCR device 72 may be used to refer to the physical extent of the components along the x-axis. The physical extent of components along the z-axis may be referred to as a "width." Cutting plane M-M' defines the cross-sectional view of the exhaust pipe 202 shown in FIGS. 3A-3C.

The SCR device 72 may include an outer body 210 comprising a curved surface 212 located between a first surface 214 and a second surface. The outer body 210 is contiguous as one example. The second surface is occluded in the view 200 by the curved surface 212 and the first surface 214. The second surface is substantially identical to the first surface 214, where both surfaces are circles with similar radii. The first surface 214 and the second surface are opposite one another about the curved surface 212. The first 214 and second surfaces are parallel to one another and physically coupled to opposite circumferential edges of the curved surface 212. In this way, the outer body 210 is a cylinder in one example. The outer body 210 may be other suitable shapes, for example, frustoconical. Thus, a cross-section of the outer body 210 is circular along a plane defined by the y- and z-axes (or parallel to the cutting plane M-M', for example) in the horizontal direction along the x-axis (according to the direction of gravity shown by arrow 299, for example). In one example, the cross-section of the outer body 210 taken parallel to the cutting plane M-M' is substantially identical to any other cross-section of the outer body 210 parallel to the cutting plane M-M'.

The outer body 210 may be comprised of any suitable materials, such as, plastic, metal, metal alloys, etc. The surfaces of the outer body 210 may be physically coupled to one another via welds, fusions, adhesives, or other suitable coupling elements. The outer body 210 may define a hollow interior of the SCR device 72. Thus, exhaust gas may flow through the interior of the SCR device 72 before flowing through a tailpipe to an ambient atmosphere. However, exhaust gas may not flow through the outer body 210 to the ambient atmosphere. As such, the surfaces of the outer body 210 are hermetically sealed with one another and impervious to exhaust gas flow. Said another way, exhaust gas may enter and/or exit the SCR device 72 only via the exhaust passage 48, in one example.

Exhaust gas entering the SCR device 72 may rotate one or more plates of the SCR device 72. As such, the SCR device 72 may further include a first bushing 220 located on the first surface 214 and a second bushing located on the second surface directly opposite the first bushing 220. The first bushing 220 protrudes through an opening of the first surface 214 and may be in sealing contact with the opening such that exhaust gas does not flow through the opening and/or first bushing 220 to the ambient atmosphere. The bushings are located on a rotation axis 295.

Located above the first bushing 220 along the first surface 214 is a passage, such as hollow shaft 230, which may be fluidly coupled to a reservoir having reductant (reservoir 74 in the embodiment of FIG. 1, for example). In one example, the reductant may be urea and the shaft 230 may route the urea from the reservoir to the interior of the SCR device 72. As such, the shaft 230 is configured to deliver urea to the interior of the SCR device 72, where the urea flows along the first surface 214 parallel to the y-axis in a direction of gravity (shown by arrow 299, for example). In one example, the shaft 230 is adapted to pour reductant (urea, for example) into the interior of the SCR device 72. In some examples, the shaft 230 may be an injector configured to spray atomized urea into the interior of the outer body 210.

As shown, the exhaust pipe 202 is coupled to the curved surface 212 at a vertical height between the shaft 230 and the first bushing 220. Said another way, the first bushing 220 is vertically lower than the exhaust pipe 202, and the exhaust pipe 202 is vertically lower than the shaft 230. Thus, the exhaust pipe 202 is physically coupled to the curved surface 212 vertically above the rotational axis 295. As such, exhaust gas may enter and exit the SCR device 72 above the rotational axis, as will be described in greater detail below.

FIG. 2B shows an interior side perspective view 250 of SCR device 72 similar to the view 200 of FIG. 2A, but differs from the view 200 in that the curved surface 212 and the first surface 214 have been illustrated as transparent. In this way, the interior and the second surface 216 of SCR device 72 are shown.

The second surface 216 comprises a second bushing 222 located directly across the first bushing 220 along the rotational axis 295. The second bushing 222 is substantially identical to the first bushing 220. As such, the second bushing 222 protrudes through the second surface 216 similar to the protrusion of the first bushing 220 of the first surface 214. A cylindrical rod 226 is rotatably coupled to the first bushing 220 and the second bushing 222 along the rotational axis 295 of the first 214 and second 216 surfaces. The rotational axis 295 is located along an exact center of the first surface 214 and the second surface 216 such that all radii measured from the rod 226 to the curved surface 212 are substantially equal, in one example.

The rod 226 comprises a plurality of planar plates 240. In one example, there are exactly four plates 240. However, other numbers of plates have been contemplated. The plates 240 are square, in one example. The plates 240 may be other shapes in other examples corresponding to a shape of the SCR device, for example, triangular, rectangular, circular, diamond, elliptical, etc. The plates 240 are fixedly coupled to the rod 226 via welds, inserts, fusions, adhesives, or other coupling elements along an edge of the plates 240. Edges of the plates 240 that are not in contact with the rod 226 are in sealing contact with one or more of the curved surface 212, first surface 214, and second surface 216. Specifically, exhaust gas may not flow between the plates 240 and the rod 226, the curved surface 212, the first surface 214, and the second surface 216.

Furthermore, the plates 240 are configured to allow exhaust gas flow, in one example, such that exhaust gas may flow through the plates 240. Thus, as exhaust gas contacts the plates 240, the exhaust gas presses against the plates 240 where a force of the exhaust gas turns the plates 240 (and the rod 226) about the rotation axis 295 in a direction similar to arrow 296. As the plates 240 rotate, an outlet of the SCR device 72 may be revealed, allowing exhaust gas to exit the SCR device 72, as will be described in greater detail below. As such, exhaust gas rotates the plates 24 prior to flowing out of the SCR device 72.

The plates 240 are spaced around the rod 226 such that a combination of all the plates 240 resembles a plus-shape. By doing this, the plates 240 may divide the interior of the SCR device 72 into compartments (or quadrants in the example of FIG. 2B), where individual compartments are located between adjacent plates. The compartments are fluidly coupled to one another due to the porosity of the plates 240, as described above. As such, exhaust gas in one compartment may flow into a different compartment. The compartments and plates are described below in greater detail.

In some examples, the plates 240 may be impervious to exhaust gas flow such that exhaust gas may not flow through the plates. In such an example, the compartments may be fluidly separated from one another such that exhaust in a first compartment may not mix with exhaust in a second different compartment. As such, exhaust gas in one compartment of the compartments may be fluidly coupled to an outlet or an inlet of the SCR device 72, while other compartments may be fluidly sealed from the outlet and inlet based on a rotational position of the plates 240.

The plates 240 may be comprised of a porous fiber material with a structure supporting wire mesh. This may allow exhaust gas to flow through the plates 240 while still allowing exhaust gas to press against the plates 240. The plates 240 may be coated with urea and/or contain urea in porous openings. In other examples, the plates 240 may be comprised of a substrate comprising an SCR catalyst composition. The SCR catalyst composition may contain a zeolite and one or more transition metal components such as iron ("Fe"), cobalt ("Co"), copper ("Cu"), or vanadium ("V") which can operate efficiently to convert $NO_x$ constituents in the exhaust gas in the presence of a reductant such as urea or ammonia. It will be appreciated that other transition metals may be used. In one example, both sides of the plate may be coated with the catalyst.

A passage (e.g., shaft 230 in the embodiment of FIG. 2A) may dispense urea into the SCR device 72, where the urea may be stored in a lower portion of the SCR device 72 (below the rod 226, for example). The plates 240 may rotate through the urea, thereby coating surfaces of the plates 240 with urea, as exhaust gas turns the plates 240. The exhaust gas may also vaporize the urea, which may allow urea vapors to fill a headspace of the SCR device 72 above the stored urea. This may promote increased reactivity between $NO_x$ and urea in the SCR device 72 compared to SCR devices relying on a urea injection and/or static mixer. The urea and rotation of the plates 240 is described below in greater detail.

Thus, FIGS. 2A and 2B show an SCR device with a cylindrical body and rotating plates located therein. The rotating plates are engaged with the cylindrical body such that exhaust gas may rotate the plates prior to flowing out of the SCR device. A passage (shaft 230, for example) is configured to dispense urea into the cylindrical body, where the urea may pool at a lower portion of the SCR device. As such, the pooled urea may be heated as exhaust gas flows into the SCR. This heating may vaporize the urea and allow the gaseous urea to occupy compartments of the SCR device defined by the plates. By vaporizing the urea and spinning the plates in the SCR, the urea may be increasingly mixed into the SCR, thereby decreasing $NO_x$ emissions without the use of a urea injector and a mixer.

FIGS. 3A, 3B, and 3C show example positions to which the plates 240, of the SCR device 72, may be adjusted along with example exhaust flows through the SCR device 72. Thus, FIGS. 3A, 3B, and 3C show relative positioning of the plates 240 within the SCR device 72, as the plates 240 are adjusted to different rotational positions. FIGS. 3A, 3B, and 3C show cross-sectional views of the exhaust pipe 202 and the SCR device 72, where the cross-sectional plane is taken along line M-M' of FIG. 2. FIGS. 3A, 3B, and 3C show a rotational progression of the plates 240 as exhaust gas flows through the SCR device 72.

The plates 240 are rotated based on a pressure difference between an outlet 304 of the SCR device 72 and an inlet 302 of the SCR device 72, where the outlet 304 is lower in pressure than the inlet 302 due to exhaust gas flowing out the outlet 304. This creates a vacuum that allows exhaust gas pressing against one or more of the plates 240 to move the plates 240. As such, the exhaust gas may rotate the plates 240 about the rotational axis (parallel to the rod 226, for example) in a clockwise direction (shown by arrow 296) as exhaust gas flows through the SCR device 72. Thus, the plates 240 may rotate mechanically without the use of electrical components.

A rotational speed of the plates 240 is based on an exhaust mass flow. As such, as exhaust mass flow increases, then a rotational speed of the plates 240 also increases. Conversely, if the exhaust mass flow decreases, then the rotational speed of the plates 240 may decrease. In some examples, the exhaust mass flow may correspond to an engine load such that the rotational speed may be known for a given engine load. The rotational speed of the plates 240 may be further based on an amount of urea 314 in a lower portion of the SCR device 72. As shown in FIGS. 3A, 3B, and 3C, urea 314 pools in a lower portion of the SCR device 72 below a central axis 395, where the plates 240 may rotate through the urea 314 as exhaust flows through the SCR device 72. Thus, as the amount of urea 314 increases, the rotational speed of the plates may decrease. Conversely, as the amount of urea 314 decreases, the rotation speed of the plates 240 may increase. In one example, urea may be delivered to the SCR device 72 via the shaft 230 when the rotational speed of the plates 240 is greater than a threshold speed for a given engine load. In one example, the threshold speed may increase as engine load increases (the rotational speed of the plates is greater at higher engine loads, for example). Thus, if a rotational speed of the plates 240 is greater than the threshold speed at a given load, then the urea level in the SCR device 72 may be less than a threshold urea load. Thus, urea may be delivered to the SCR device 72 until the rotational speed of the plates 240 is less than the threshold speed.

Additionally or alternatively, the plates 240 may be adjusted by a motor. The motor may be electrically coupled to the SCR device 72 for rotating the plates 240 within the SCR device 72. The motor may be in electrical communication with a controller (e.g., controller 12 in the embodiment of FIG. 1), and may rotate the plates 240 based on signals received from the controller. Specifically in response to increased engine load, the controller may send signals to the motor to rotate the plates 240 at an increased speed to allow exhaust gas to flow through the SCR device 72 to limit an accumulation of exhaust backpressure. The motor may be any suitable actuator such as a hydraulic, electric, pneumatic, electromechanical, or other type of actuator. The rotational speed of the plates 240 may be adjusted by the actuator based on an engine operation. Specifically, the rotational speed may be adjusted based on one or more of an engine load, PF loading, EGR flow rate, and other conditions. As an example, the rotational speed of the plates 240 may increase as engine load increases, PF loading decreases, and EGR flow rate decreases. Conversely, the rotational speed of the plates 240 may decrease as engine load decreases, PF loading increases, and EGR flow rate increases. In such an example where the plates 240 are adjusted by a motor, the urea level may be determined via a sensor, where the urea level is replenished based on a measurement of the sensor being less than the threshold urea load. Additionally or alternatively, the urea level may be estimated based on one or more of a vehicle miles driven, exhaust gas mass flow through the SCR device 72, duration of time, emissions sensor downstream of the SCR device 72, etc.

FIGS. 3A, 3B, and 3C show cross-sectional views of the SCR device 72 located along the exhaust pipe 202. As such, the inlet 302 and the outlet 304 are located on opposite sides of the curved surface 212 of the SCR device 72. Specifically, the inlet 302 is located on an upstream side of the curved surface 212 and the outlet 304 is located on a downstream side of the curved surface 212 with respect to a general direction of incoming exhaust flow (shown by arrow 298). The curved surface 212 comprises openings corresponding to the inlet 302 and outlet 304 to allow exhaust gas to enter and exit the SCR device 72, respectively. The inlet 302 and outlet 304 may be misaligned (at different heights, for example) such that the inlet 302 is vertically (axially) higher (according to a direction of gravity shown by arrow 299) than the outlet 304 for a vehicle on the ground, in one example. It will be appreciated that the inlet 302 and outlet 304 may be aligned or that the outlet 304 may be vertically higher than the inlet 302 in some examples. Both the inlet 302 and the outlet 304 are located above a central axis 395 and rotational axis (rod 226, for example). It will be appreciated that the relationship and/or location of the inlet 302 and outlet 304 may be altered without departing from the scope of the present disclosure. By misaligning the inlet 302 and the outlet 304, the exhaust gas may further rotate the plates 240 before exiting the SCR device 72.

In this way, the curved surface 212 is divided to comprise an upper arc 320 and a lower arc 322. The upper arc 320 is located above and between the openings corresponding to the inlet 302 and the outlet 304. The lower arc 322 is located below and between the openings corresponding to the inlet 302 and the outlet 304. The upper arc 320 is shorter in length than the lower arc 322 such that the lower arc 322 spans over half of a circumference of the curved surface 212. The upper arc 320 spans a remaining portion of the circumference of the curved surface 212 not comprising the openings and the lower arc 322. Specifically, an angle $\theta_1$ corresponds to an arc length of the upper arc 320. The angle $\theta_1$ will be described in greater detail below.

As exhaust gas enters the SCR device 72, it contacts the plates 240 rotatably located between the upper arc 320 and the lower arc 322 of the curved surface 212 in the SCR device 72. Specifically, there are four plates 240, which include a first plate 342, a second plate 344, a third plate 346, and a fourth plate 348. As described above, the plates 240 may be porous and allow exhaust gas to flow between compartments (or quadrants, for example). Thus, exhaust gas flows into a quadrant of the SCR device 72 located between two adjacent plates. The exhaust gas presses on a most downstream plate of the quadrant and rotates the plates 240 clockwise. Exhaust gas may also flow to adjacent quadrants and out through the outlet 304. In one example, exhaust gas entering the SCR device 72 flows into a quadrant and rotates the plates before flowing out the SCR device 72 and into the outlet 304. In embodiments where the plates 240 are impervious to exhaust gas flow, exhaust gas is held in a single quadrant and does not flow to adjacent quadrants. Furthermore, the exhaust gas rotates its respective quadrant until the quadrant aligns with the outlet 304 such that exhaust gas may exit the SCR device 72.

Each of the plates 240 is separated by an angle $\theta_2$. In one example, the angle $\theta_2$ is exactly 90° such that the plates 240 are in a plus-shape configuration. Thus, adjacent plates are perpendicular to each other and plates opposite one another are parallel. In some examples, the angle $\theta_2$ may be greater than 90° (if there are less than four plates, for example, three plates) or the angle $\theta_2$ may be less than 90° (if there are more than four plates, for example, five plates). Angle $\theta_1$ is an angle measured from the rod 226 to the edges of the upper arc 320. Thus, the angle $\theta_1$ corresponds to an arc length of the upper arc 320. In one example, the angle $\theta_1$ is greater than the angle $\theta_2$. Thus, if the angle $\theta_2$ is increased, then the angle $\theta_1$ may be correspondingly increased. In this way, the angle $\theta_1$ is greater than a greatest angle measured between adjacent plates of the plates 240. As such, one or more of the first 342, second 344, third 346, and fourth 348 plates may be engaged with the upper arc 320 at any position of the plates 240. In one example, at least one of the plates 240 is engaged with the upper arc 320 in any rotational position of the plates 240. Additionally, during some positions of the rotation of the plates 240, two plates of the plates 240 may be engaged with the upper arc 320 at the same time.

Thus, the SCR device 72 is configured to receive exhaust gas and allow the exhaust gas to rotate plates 240 before flowing out of the SCR device 72. As described above, the plates 240 pass through the urea 314. By doing this, urea may coat surfaces of the plates 240 or the urea may be vaporized by being exposed to hot exhaust gas flowing through the plates 240. The vaporized urea may occupy a head space 312 of the SCR device 72 located above the stored urea 312. This may increase a likelihood of exhaust gas contacting urea before exiting the SCR device 72. As such, exhaust gas enters the SCR device 72 and contacts at least one plate of the plates 240, thereby rotating the plates 240 in the clockwise direction before exiting the SCR device 72. When the exhaust gas presses against the plates 240, the exhaust gas may also react with urea located on the surfaces of the plates 240 or gaseous urea located in the head space 312. This may reduce $NO_x$ output, thereby reducing emissions emitted to the ambient environment.

FIGS. 3A, 3B, and 3C will now be described individually. FIGS. 3A, 3B, and 3C show a rotation of the plates 240 as a sample exhaust flow flows through the SCR device 72.

Turning now to FIG. 3A, it shows a first embodiment 300 of the SCR device 72 with the plates 240 in a first rotational position where the second 344 and fourth 348 plates are parallel to the central axis 395 (and exhaust pipe 202, for example). Thus, the first 342 and third 346 plates are perpendicular to the central axis 395. The first plate 342 is engaged with the upper arc 320 and the second 344, third 346, and fourth 348 plates are engaged with the lower arc 322. Exhaust gas flows into the SCR device 72 from the inlet 302 (shown by arrow 330), where the exhaust gas enters a first quadrant 352 between the first plate 342 and the fourth plate 348. Exhaust gas in the first quadrant 352 may flow to the other quadrants including a second quadrant 354 between the first plate 342 and the second plate 344, a third quadrant 356 between the second plate 344 and the third plate 346, and a fourth quadrant 358 between the third plate 346 and the fourth plate 348. In one example, exhaust gas may flow through the plates 240 and out the SCR device 72 independent of a rotational position of the plates 240. Exhaust gas may flow through at least the first plate 342 before flowing out the SCR device 72 and into the outlet 304. Furthermore, exhaust gas may flow through at least the first 352 and second 354 quadrants before exiting the SCR device 72.

As shown, a portion of the exhaust flow entering the first quadrant 352 presses against the first plate 342 (as shown by arrows 332, for example) while a remaining portion of exhaust gas may occupy the first quadrant 352 without pressing against or contacting the first plate 342. The remaining portion of exhaust gas flow may also flow into any of the other quadrants, where the exhaust gas may heat urea or flow through the outlet 304 (as shown by arrows 331 and 333, respectively). Exhaust gas pressing against the first plate 342 rotates the plates 240 in the clockwise direction. As exhaust gas exits the SCR device 72, a pressure near the outlet 304 decreases which may further enable exhaust gas to spin the plates 240.

Alternatively, if the plates 240 are impervious to exhaust gas flow, only exhaust gas in the second quadrant 354 may flow into the outlet 304 when the plates 240 are in the first rotational position in the example shown. Thus, exhaust gas in the first quadrant 352 may rotate the plates 240 until the first quadrant 352 is fluidly coupled to the outlet 304. The exhaust gas may then flow out the SCR device 72 and through the outlet 304.

Turning now to FIG. 3B, it shows a second embodiment 325 of the SCR device 72 with the plates 240 in a second rotational position. It will be appreciated that a plurality of rotational positions may occur between the first rotational position in the first embodiment 300 of FIG. 3A and the second rotational position. Thus, the rotational positions described in the present disclosure are example rotational positions. In the second rotational position, all of the plates 240 are oblique to the central axis 395 (by an angle of 45°, for example). As such, the first 342 and fourth 348 plates are engaged with the upper arc 320 and the second 344 and third 346 plates are engaged with the lower arc 322. Thus, exhaust gas flow entering the SCR device 72 (shown by arrow 360) flows through at least the fourth plate 348 and the first plate 342 before flowing into the outlet 304. Additionally, exhaust gas may flow through at least the first 352, second 354, and fourth 358 quadrants before exiting the SCR device 72. A portion of the exhaust gas in the fourth quadrant 358 presses against the fourth plate 348 (shown by arrows 362, for example) while a remaining portion of the exhaust gas may heat the urea, press against the first plate 342 with exhaust flow shown by arrow 332, or it may exit the SCR device. The exhaust gas contacting the pooled urea 314 may vaporize the urea such that urea vapors may occupy the head space 312. This enables the head space 312 to be replenished with urea vapor as $NO_x$ is reduced by the vapors or as vapors are swept out of the SCR device 72 by exhaust gas. The exhaust gas in the SCR device 72 may react with urea on surfaces of any of the plates 240 in one example. As shown, both exhaust gas in the first quadrant 352 and in the fourth quadrant 358 push against first 342 and fourth 348 plates, respectively, to turn the plates 240 in the clockwise direction (arrow 296).

In some embodiments where the plates are impervious to exhaust gas flow, then only exhaust gas in the second quadrant 354 may exit the SCR device 72. Furthermore, exhaust gas in the first quadrant 352 may not contact the urea 314, while exhaust gas in the other quadrants may contact urea in the rotational position shown in the embodiment of FIG. 3B.

Turning now to FIG. 3C, it shows a third embodiment 350 of the SCR device 72 with plates 240 in a third rotational position. As a result, the second 344 and third 346 plates are engaged with the lower arc 322 and the fourth plate 348 is engaged with the upper arc 320. The first plate 342 is not engaged with either the upper arc 320 or the lower arc 322. Thus, exhaust gas entering the SCR device 72 flows through at least the fourth plate 358 before flowing out the SCR device 72. As such, the first plate 342 is directed toward the opening corresponding to the outlet 304 such that exhaust gas may flow out of the first quadrant 352 (shown by arrows 334) and into the outlet 304 along with exhaust gas flowing out of the second quadrant 354 into the outlet 304. In one example, exhaust gas flowing out of the first quadrant 352 (arrows 334) comprises less $NO_x$ than exhaust gas flowing into the first quadrant 352 in FIG. 3A (arrows 330). As the exhaust gas flows out of the first quadrant 352, the pressure inside the first quadrant 352 decreases, thereby allowing exhaust gas pressing against the fourth plate 358 to further rotate the plates 240.

Thus, FIGS. 3A, 3B, and 3C depict example exhaust flows into the SCR device along with example rotation positions illustrating an interaction between exhaust gas and components of the SCR device. As described above, the exhaust gas rotates the plates due to pressure changes between the inlet and the outlet of the SCR device. This rotation may improve exhaust gas mixing with vaporized urea in the SCR device. Furthermore, the plates rotate through the urea, which allows urea to coat surfaces of the plates. As described above, exhaust gas flows through at least one plate of the plates before flowing out of the SCR device. This may further decrease emissions released to an ambient atmosphere. As the urea reacts with constituents in the exhaust gas, the urea is consumed and a urea load in the SCR device decreases. As such, a speed of rotation of the plates may increase as the urea load decreases. A method for replenishing a urea load in the SCR device will be described below.

FIG. 4 shows a method 400 for flowing urea to the SCR device based on a rotation speed of the plates. It will be appreciated that urea may be delivered to the SCR device based on other conditions as well, as will be described below. Instructions for carrying out method 400 may be executed by a controller (controller 12 of FIG. 1, for example) based on instructions stored on a memory of the controller and in conjunction with signals received from sensors of the engine system, such as the sensors described above with reference to FIG. 1. The controller may employ engine actuators of the engine system to adjust engine operation, according to the methods described below.

Method 400 begins at 402, where the method 400 estimates current engine operating parameters. The engine operating parameters may include but are not limited to engine load, engine speed, exhaust mass flow rate, EGR flow rate, exhaust temperature, spark timing, and air/fuel ratio. At 404, the method 400 estimates a rotational speed of the SCR plates. The rotational speed may be estimated based on one or more of an engine load, exhaust mass flow rate and EGR flow rate, and air/fuel ratio. The rotational speed may be further estimated based on feedback from a speed sensor located in the SCR device.

At 406, the method 400 includes determining if the rotational speed of the SCR plates is greater than a threshold speed. The threshold speed may be based on a combination of one or more of the engine load, exhaust mass flow rate, EGR flow rate, spark timing, and air/fuel ratio. For example, the rotational speed may increase if one or more of the engine load increases, exhaust mass flow rate increases, and EGR flow rate decreases. The threshold speed may decrease if the engine load decreases, exhaust mass flow rate decreases, EGR flow rate increases, spark timing is advanced or an air/fuel ratio is outside of stoichiometric (lean or rich, for example). In this way, the threshold speed may change based on changing engine conditions. If the method 400 determines that the estimated rotational speed is not greater than the threshold speed, then the method continues to 408 to maintain current engine operating parameters and to not flow urea to the SCR device. Since the rotational speed is equal to or less than the threshold speed, urea in the SCR device may be at a desired load. As such, the urea sufficiently impedes the rotation of the plates such that the rotational speed of the plates does not exceed the threshold speed.

In some embodiments, the urea load may be determined to be too low based on other conditions, such as, a threshold time for example. The threshold time may be based on an average duration of time which may deplete the urea to less than a desired amount of urea. Additionally or alternatively, the urea may be too low if a threshold amount of exhaust flow has passed through the SCR device. The threshold amount may be based on an amount of exhaust flow which may reduce the urea load to less than the desired amount of urea. The amount of exhaust flow may be determined by feedback from a mass flow sensor upstream and/or downstream of the SCR device.

If the rotational speed is greater than the threshold speed, then a urea load in the SCR device may be too low to sufficiently impede a rotation of the plates. As a result, the plates may spin too fast. This may lead to insufficient treatment of exhaust gas due to not enough urea being vaporized and the exhaust gas flowing through the SCR device too quickly. Said another way, the plates may spin too quickly for $NO_x$ in the exhaust gas to be reduced in the presence of less vaporized urea. Thus, when the rotation speed is determined to be greater than the threshold speed, the method 400 proceeds to 410 to flow urea to the SCR device until the rotation speed is less than or equal to the threshold speed. Flowing urea to the SCR device includes flowing urea from a urea reservoir (e.g., urea reservoir 74 of FIG. 1) via a pump to a passage (shaft 230 of FIG. 2A) where the passage pours urea along a first surface (first surface 214 of FIG. 2A) into the SCR device. The urea pools in a lower portion of the SCR device against a portion of a curved surface (lower arc 322 of the curved surface 212 in FIGS. 3A-3C, for example). In this way, the urea load in the SCR device is filled to a load that does not overly impede the rotation of the plates such that an exhaust backpressure upstream of the SCR device is increased. At 412, the method 400 disables (or terminates) the pump to stops flowing urea to the SCR device.

In this way, an SCR device may efficiently treat exhaust without relying on a urea injector to disperse urea in an exhaust stream. By rotating a plurality of plates comprised of one or more SCR catalysts through urea stored in a bottom of the SCR, the urea may be vaporized by the exhaust gas while also coating surfaces of the plates contacting the pooled urea. The technical effect of rotating SCR plates as exhaust gas flows through the SCR is to more evenly distribute urea across surfaces of the SCR to promote increased reactivity between urea and constituents in the exhaust gas. Furthermore, a rotation speed of the plates may be used to determine when a urea load in the SCR is less than a desired amount. By doing this, a size restriction of the engine may be reduced due to urea efficiently coating surfaces of the SCR without a urea injector and/or urea mixer. This may increase engine efficiency and reduce emissions.

A system comprising a hollow cylindrical selective catalytic reduction device located along an exhaust passage comprising a plurality of plates configured to rotate via a rotatable rod as exhaust gas flows in and out of the device and a passage configured to flow urea into the device, where the urea pools in a lower portion of the device. A first example of the system further includes where the exhaust passage comprises an exhaust pipe physically coupled to the device further comprising an upstream portion and a downstream portion relative to exhaust flow, and where the upstream portion is vertically higher than the downstream portion. A second example of the system optionally including the first example further includes where the device comprises a curved surfaced located between identical circular surfaces, and where the curved surface is divided into an upper arc and a lower arc. A third example of the system optionally including one or more of the first and second examples further includes where an angle measured from the center of the device to outer edges of the upper arc being greater than a largest angle measured between two adjacent plates. A fourth example of the system optionally including one or more of the first through third examples further includes where the plates divide an interior of the device into fluidly separated compartments. A fifth example of the system optionally including one or more of the first through fourth examples further includes where the plates are positioned to rotate through the pooled urea. A sixth example of the system optionally including one or more of the first through fifth examples further includes where the plates are porous and configured to allow exhaust gas to flow through them. A seventh example of the system optionally including one or more of the first through sixth examples further includes where the device comprises four plates, and where an angle between the plates is equal to 90°. An eighth example of the system optionally including one or more of the first through seventh examples further includes where the plates are comprised of one or more catalyst, porous fiber material, and wire mesh.

A method comprising rotating a plurality of plates in an SCR device as exhaust gas flows into the SCR device and adjusting an amount of urea delivered to the SCR device based on a rotational speed of the plates. A first example of the method further includes where the urea being delivered to the SCR device is terminated in response to the rotational speed of the plates being less than the threshold speed. A second example of the method optionally including the first example further includes where the threshold speed is based on one or more of an engine load, exhaust mass flow rate, EGR flow rate, fuel injection pressure, and spark timing.

An exhaust system comprising an exhaust pipe, an SCR device comprising a hollow cylindrical body with first and second circular surfaces opposite one another with a curved surface located therebetween, and where the exhaust pipe is physically coupled to the curved surface via an inlet and an outlet at axially different heights, a plurality of plates located inside the SCR physically coupled to a rotatable rod located along a rotational axis aligned with a center of the first and second surfaces, and a passage configured to flow urea to the SCR device, where the urea pools in a lower portion below a central axis of the SCR. A first example of the exhaust system further includes where the inlet is axially above the outlet. A second example of the exhaust system optionally including the first example further includes where the plurality of plates comprises four square porous plates, and where an angle between each of the plates is equal to 90°. A third example of the exhaust system optionally including the first and second examples further includes where the plates divide an interior of the SCR into compartments, and where exhaust gas flows through at least two compartments before exiting the SCR. A fourth example of the exhaust system optionally including the first through third examples further includes where the pooled urea is exposed to exhaust gas flow flowing through the plates in the SCR device. A fifth example of the exhaust system optionally includes one or more of the first through fourth examples further includes where the curved surface comprises an upper arc and a lower arc located between the inlet and outlet on the curved surface, and where the lower arc is longer than the upper arc. A sixth example of the exhaust system optionally includes one or more of the first through fifth examples further includes where the upper arc comprises an angle smaller than an angle of the lower arc, and where both angles are greater than an angle between the plates, and where one or the plates is engaged with the upper arc independent of a rotational position of the plates. A seventh example of the exhaust system optionally includes one or more of the first through sixth examples further includes where the plates are mechanically rotated via exhaust gas flow.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
    a hollow cylindrical selective catalytic reduction device located along an exhaust passage comprising a plurality of plates configured to rotate via a rotatable rod as exhaust gas flows through the device; and
    a passage configured to flow urea into the device, where the urea pools against a lower arc of a curved surface of the device, the curved surface being divided into an upper arc and the lower arc, and where an angle measured from a center of the device to outer edges of the upper arc is greater than a largest angle measured between two adjacent plates of the plurality of plates.

2. The system of claim 1, wherein the exhaust passage comprises an exhaust pipe physically coupled to the device, further comprising an inlet and an outlet, and where the inlet is vertically higher than the outlet.

3. The system of claim 1, wherein the curved surface is located between identical circular surfaces.

4. The system of claim 1, wherein the plates divide an interior of the device into compartments, where exhaust gas in a first compartment is able to flow through one or more plates into a second, different compartment.

5. The system of claim 1, wherein the plates are positioned to rotate through the pooled urea.

6. The system of claim 1, wherein the plates are impervious to exhaust gas flow.

7. The system of claim 1, wherein the device comprises four plates, and where an angle between the plates is equal to 90°.

8. The system of claim 1, wherein the plates are comprised of one or more of a catalyst, porous fiber material, and a wire mesh.

9. A method comprising:
    rotating a plurality of plates coupled to a rotating rod in an SCR device as exhaust gas flows into the SCR device, where exhaust gas rotates the plates about an axis of the rotating rod perpendicular to a direction of exhaust gas flow; and
    adjusting an amount of urea delivered to the SCR device by a hollow shaft based on a rotational speed of the plates through pooled urea.

10. The method of claim 9, wherein the urea being delivered to the SCR device is terminated in response to the rotational speed of the plates being less than a threshold speed.

11. The method of claim 10, wherein the threshold speed is based on one or more of an engine load, exhaust mass flow rate, EGR flow rate, fuel injection pressure, and spark timing.

12. An exhaust system comprising:
    an exhaust pipe;
    an SCR device comprising a hollow cylindrical body with first and second circular surfaces opposite one another with a curved surface located therebetween, and where the exhaust pipe is physically coupled to the curved surface via an inlet and an outlet at axially different heights;
    a plurality of plates located inside the SCR device physically coupled to a rotatable rod located along a rotational axis aligned with a center of the first and second circular surfaces; and
    a passage configured to flow urea to the SCR device, where the urea pools in a lower portion below a central axis of the SCR device.

13. The exhaust system of claim 12, wherein the inlet is axially above the outlet.

14. The exhaust system of claim 12, wherein the plurality of plates comprises four square porous plates, and where an angle between each of the plates is equal to 90°.

15. The exhaust system of claim 12, wherein the plates divide an interior of the SCR device into compartments, and where exhaust gas flows through at least two compartments before exiting the SCR device.

16. The exhaust system of claim 12, wherein the pooled urea is exposed to exhaust gas flow flowing through the SCR device.

17. The exhaust system of claim 12, wherein the curved surface comprises an upper arc and a lower arc located between the inlet and outlet on the curved surface, and where the lower arc is longer than the upper arc.

18. The exhaust system of claim 17, wherein the upper arc comprises an angle smaller than an angle of the lower arc, and where both angles are greater than an angle between the plates, and where one of the plates is engaged with the upper arc independent of a rotational position of the plates.

19. The exhaust system of claim 12, wherein the plates are mechanically rotated via exhaust gas flow.

* * * * *